United States Patent
Hasan et al.

(10) Patent No.: US 12,530,532 B2
(45) Date of Patent: Jan. 20, 2026

(54) METHODS AND SYSTEMS FOR MULTIMODAL CONTENT ANALYTICS

(71) Applicant: Comcast Cable Communications, LLC, Philadelphia, PA (US)

(72) Inventors: Md Mahmudul Hasan, Arlington, VA (US); Aya Abdelsalam Ismail, College Park, MD (US); Faisal Ishtiaq, Plainfield, IL (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 277 days.

(21) Appl. No.: 17/099,292

(22) Filed: Nov. 16, 2020

(65) Prior Publication Data

US 2021/0151034 A1    May 20, 2021

Related U.S. Application Data

(60) Provisional application No. 62/935,397, filed on Nov. 14, 2019.

(51) Int. Cl.
| | | |
|---|---|---|
| *G06F 40/30* | (2020.01) | |
| *G06V 10/764* | (2022.01) | |
| *G06V 10/772* | (2022.01) | |
| *G06V 10/776* | (2022.01) | |
| *G06V 10/82* | (2022.01) | |
| *G06V 20/40* | (2022.01) | |
| *G06V 20/62* | (2022.01) | |
| *G06V 40/16* | (2022.01) | |
| *G10L 15/16* | (2006.01) | |
| *G10L 15/183* | (2013.01) | |

(52) U.S. Cl.
CPC ............ *G06F 40/30* (2020.01); *G06V 10/764* (2022.01); *G06V 10/772* (2022.01); *G06V 10/776* (2022.01); *G06V 10/82* (2022.01); *G06V 20/41* (2022.01); *G06V 20/635* (2022.01); *G06V 40/174* (2022.01); *G10L 15/16* (2013.01); *G10L 15/183* (2013.01)

(58) Field of Classification Search
CPC .. G06F 40/30; G06F 16/244; G06F 16/24578; G06F 40/20; G06F 40/40; G06F 18/241; G06F 18/256; G10L 15/16; G10L 15/183; G10L 25/30; G10L 25/63; G10L 13/00; G10L 15/1822; G10L 15/22; G10L 15/26; G10L 2015/223; G10L 25/57
See application file for complete search history.

(56) References Cited

U.S. PATENT DOCUMENTS

| | | | |
|---|---|---|---|
| 9,431,003 B1* | 8/2016 | Cecchi | G10L 13/08 |
| 10,037,767 B1* | 7/2018 | Nichkawde | G06F 40/205 |
| 10,546,235 B2* | 1/2020 | Moudy | G06F 40/30 |
| 2004/0111432 A1* | 6/2004 | Adams, Jr. | G06F 16/5838 |
| 2018/0012166 A1* | 1/2018 | Devadas | G06Q 10/06315 |
| 2021/0090592 A1* | 3/2021 | Lee | G10L 15/26 |
| 2021/0160581 A1* | 5/2021 | Difrancesco | G10L 25/63 |

* cited by examiner

*Primary Examiner* — Abdelali Serrou
(74) *Attorney, Agent, or Firm* — Ballard Spahr LLP (57) ABSTRACT

A modality attention network (MAN) may analyze a content item (e.g., video, multimedia, live communications, etc.) and accurately determine (e.g., recognize, identify, predict, etc.) an expression, such as an emotion. The MAN is scalable and may include subnetworks pre-trained independently for a specific modality. Pre-training each subnetwork allows better learning of intra-modal dynamics and may produce a more accurate result for a specific task than traditional modality fusion techniques.

24 Claims, 7 Drawing Sheets

METHODS AND SYSTEMS FOR MULTIMODAL CONTENT ANALYTICS

CROSS-REFERENCE TO RELATED PATENT APPLICATION

This application claims priority to U.S. Provisional Application No. 62/935,397 filed Nov. 14, 2019, which is herein incorporated by reference in its entirety.

BACKGROUND

Communication may include multiple modalities, such as spoken words, facial and physical expressions, and vocal changes (e.g., voice inflection, etc.). Machine learning models used to analyze, understand, and/or predict occurrences in communications, such as communications in video, use fusion modality analysis to address each modality of a multimodal communication collectively. Because data from different modalities have different convergence rates, attention in machine learning models may apply a greater weight to a modality that converges faster than another modality, even if the modality that converges faster contains the least amount of information useful for a final analysis/prediction. Therefore, machine learning models are unable to differentiate between ambiguous modalities that may barely affect the context of a communication and important modalities on which the context of a communication may be built. For example, a machine learning model may determine that a person in a scene of video is laughing. However, a laugh may be either a happy expression or a sarcastic expression. Without an understanding of other modality factors, such as body movement, facial expressions, spoken words, voice tone, and/or the like, a machine learning model may misinterpret what is being communicated.

SUMMARY

It is to be understood that both the following general description and the following detailed description are exemplary and explanatory only and are not restrictive. Methods and systems for multimodal content analytics are described. A modality attention network (MAN) may be used to analyze a content item (e.g., video, multimedia, live communications, etc.) and accurately determine (e.g., recognize, identify, predict, etc.) an expression, such as an emotion. An accurate determination of an expression may be achieved by independently training a plurality of modality-specific subnetworks (e.g., bi-directional neural networks, long short-term memory (LSTM) networks, recurrent neural networks (RNN), etc.) to effectively identify various modalities of communication. For example, a separate subnetwork may be trained for a visual modality, an audio modality, and a textual modality. An attention block may be used to determine a probability for each modality that represents the importance of the modality in determining the expression. The output of each trained sublayer may be provided to the attention block, and an attention mechanism may calculate a weight for each modality. The weights calculated by the attention mechanism may define the importance of the modality in determining the expression. The attention block may produce a weighted combination of all the modalities. A softmax layer may be applied to the output of the MAN for a final determination of the expression This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A modality attention network (MAN) may be used to analyze a content item (e.g., video, multimedia, live communications, etc.) and accurately determine (e.g., recognize, identify, predict, etc.) an expression, such as an emotion. An accurate determination of an expression may be achieved by independently training a plurality of modality-specific subnetworks (e.g., neural networks, long short-term memory (LSTM) networks, recurrent neural networks (RNN), etc.) to effectively identify various modalities of communication. For example, a separate subnetwork may be trained for a visual modality, an audio modality, and a textual modality. Independently training each subnetwork may learn intra-modal dynamics (e.g., dynamics within each modality) and produce an embedding for each modality that that may be passed to an attention block.

The attention block may be used to determine a probability for each modality that represents the importance of the modality in determining the expression. The output of each trained sublayer may be provided to the attention block and an attention mechanism may calculate a weight for each modality. The weights calculated by the attention mechanism may define the importance of the modality in determining the expression. The attention block may produce a weighted combination of all the modalities. Attention enables the MAN to focus on a modality (e.g., visual modality, audio modality, textual modality, etc.) with the most information (the most prominently expressed modality) for a given sample (e.g., content item, video segment, etc.).

A softmax layer may be applied to the output of the MAN for a final determination of the expression.

Figure 1:
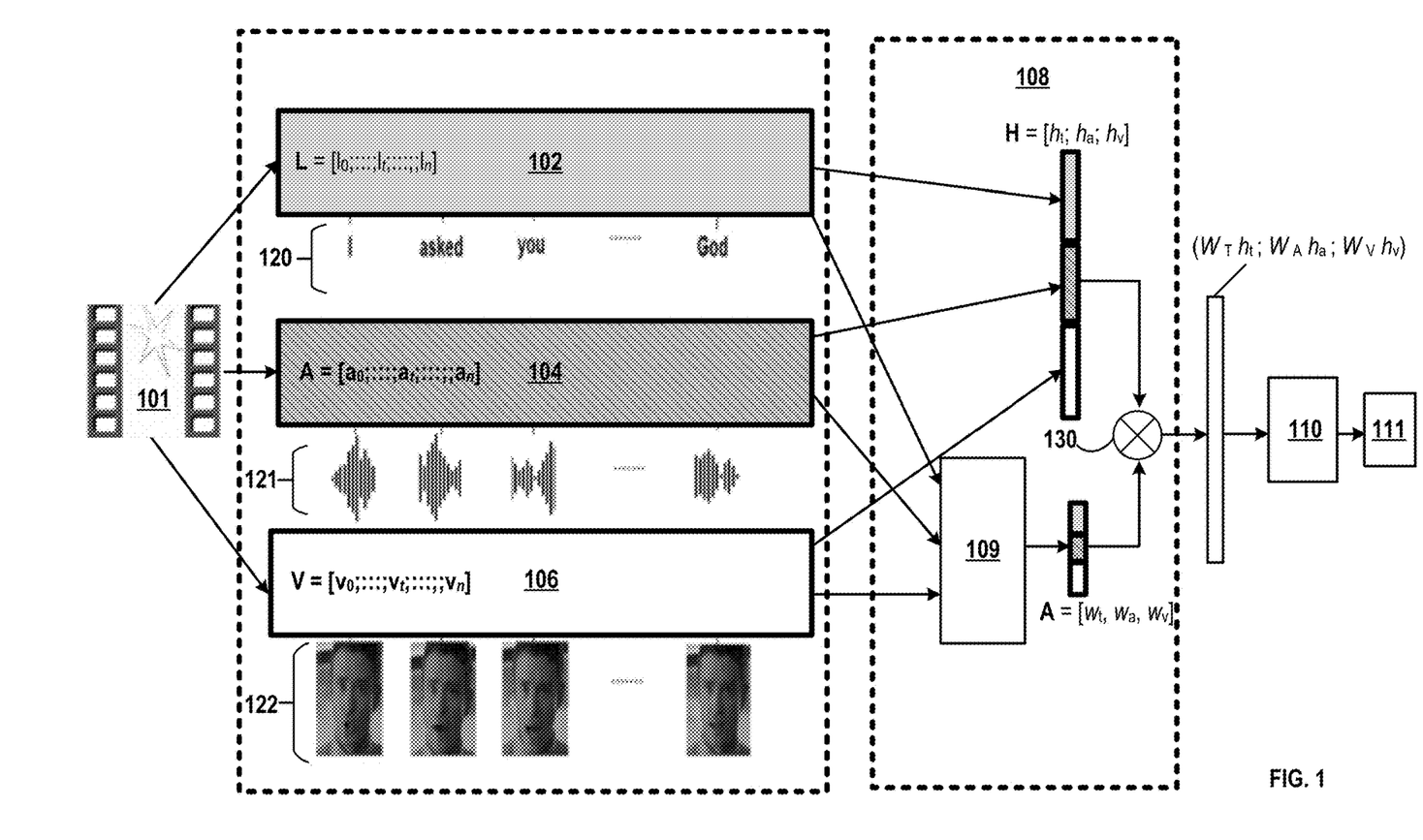
FIG. 1 shows a system for multimodal content analytics.

FIG. 1 shows a system 100 for multimodal content analytics. One skilled in the art will appreciate that provided herein is a functional description and that the respective functions may be performed by software, hardware, or a combination of software and hardware.

The system 100 (e.g., a modality attention network (MAN)) may determine an expression within a content item (e.g., video, multimedia, live communication). The system 100 may comprise subnetworks 102, 104, and 106. The subnetworks 102, 104, and 106 may each be an independently trained neural network. The subnetworks 102, 104, and 106 may be any type of neural network. For example, subnetworks 102, 104, and 106 may include long short-term memory (LSTM) neural networks. The subnetworks 102, 104, and 106 may each be independently trained to determine (e.g., recognize, identify, predict, etc.) different modalities of communication, such as an emotion expressed in a video, and/or the like.

The content item 101 may be a timecoded segment of a video. Features 120, 121, and 122 may be extracted from the content item 101 (a segment of video) at regular time intervals so that features for each modality (textual, audio, visual, etc.) are aligned (and/or normalized). Features 120 may be textual features (e.g., data/information, closed captions, etc.) extracted from the content item 101. Features 121 may be audio features (e.g., data/information, an audio track, etc.) extracted from the content item 101. Features 123 may be visual features (e.g., data/information, pixels, facial/object recognition data, etc.) extracted from frames of the content item 101. The content item 101 and the features 120, 121, and 122 may be used to form a labeled dataset (e.g., classified/tagged data, an identity matrix, etc.). The labeled dataset may be used to train the subnetworks 102, 104, and 106. For example, the labeled dataset may inform of an expression (e.g., emotion, etc.) occurring in the content item 101, such as whether the content item 101 contains a person, what facial expression the person may have, which words are uttered in the audio, what type of actions are being performed in content item 101, and/or the like.

Subnetwork 102 may be trained with respect to textual modality. Subnetwork 104 may be trained with respect to audio modality. Subnetwork 106 may be trained with respect to visual modality. Training the subnetworks 102, 104, and 106 independently may enable the system 100 a better learning of intra-modal dynamics because the training phase for each subnetwork to learn a particular modality is not affected by other modalities. The use of a textual modality, for example, training the subnetwork 102, may be used to increase/improve the accuracy of determining/predicting an expression (e.g., emotion, etc.) occurring in the content item 101 by aiding analysis associated with an audio modality and/or video modality.

After the subnetworks 102, 104, and 106 are trained, the softmax layer at the end of each of the subnetworks 102, 104, and 106 may be removed. An unlabeled dataset from the content item 101 may be used as an input to the system 100. The last hidden layer at the end of each of the subnetworks 102, 104, and 106 may be used as input to an attention block 108. The attention block 108 may include an attention module 109 that calculates weights for the outputs (e.g., emotion predictions, etc.) of the subnetworks 102, 104, and 106 with respect to the importance.

For example, the input to the textual modality subnetwork 102 may be denoted as $T=[t_0; \ldots ; t_t; \ldots ; 1_n]$ where $t_t$ is the tth word in a sentence extracted from the content item. Similarly, the input to the audio modality subnetwork 102 and visual modality subnetwork 102 may be denoted A and V respectively. The output of the subnetworks 102, 104, and 106 (the last hidden layers) may be modeled as: $h_t=LSTM_t(T)$; $h_a=LSTM_a(A)$; $h_v=LSTM_v(V)$, where $h_t$; $h_a$; $h_v$ each have the same dimension N.

A Matrix H may be passed through the attention block 108, where $H=[h_t; h_a; h_v]$. H may have the dimensions m×H, where m is the number of modalities (e.g., m=3; textual modality, audio modality, visual modality).

The matrix H may be passed to the attention block 108 and the attention module 109 may produce a weight matrix A as an output. For example, the attention module 109 may produce an attention matrix A as an output using the following equation: $A=softmax(W_2 (tan\ h(W_1 H^T+b_1))+b_2)$, where weight matrices $W_1$ and $W_2$ have dimensions k×N and 1×k respectively, and k is a hyper-parameter. The softmax ( ) may be used to ensure that all the sum of the calculated weights equal 1. The attention matrix $A=[w_t, w_a, w_v]$, where weights $w_1$, $w_a$, $w_v$ represent the importance of the subnetworks 102, 104, and 106, respectively. For example, the weights $w_t$, $w_a$, $w_v$ may represent the importance of each prediction of an emotion occurring in the scene of the content item 101 made by the subnetworks 102, 104, and 106.

At 130, the hidden layer of the subnetworks 102, 104, and 106 may be multiplied ($W_T$; $W_A$; $W_V$) by its respective weight determined by the attention module 109. The results may be concatenated together ($W_T h_t$; $W_A h_a$; $W_V h_v$) and passed through a dense layer 110 (e.g., fully connected layer) then through a softmax layer 111. The softmax layer 111 may provide a determination of an emotion expressed in the content item 101 based on the weighted probability predictions of the subnetworks 102, 104, and 106. The system 100 may be used to predict and/or determine any occurrence and/or expression within and/or associated with a content item.

Figure 2:
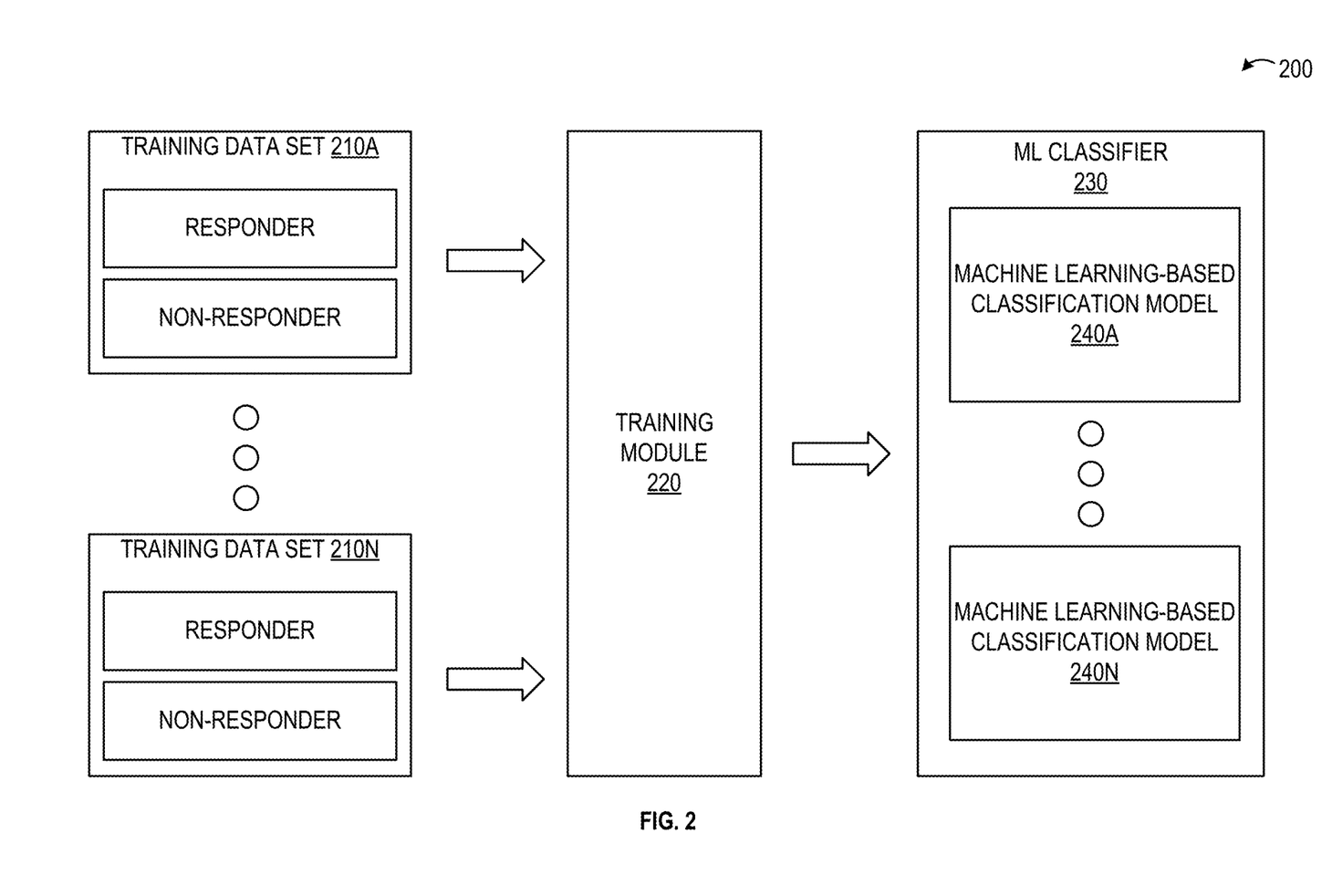
FIG. 2 shows an example machine learning model for multimodal content analytics.

FIG. 2 is an example system 200 for multimodal content analytics. The system 200 may use machine learning techniques to train, based on an analysis of one or more training datasets 210A-210N by a training module 220, at least one machine learning-based classifier 230 that is configured to classify features (e.g., modal features, textual features, visual features, audio features, etc.) extracted from content and/or a content item. The machine learning-based classifier 230 may classify features extracted from content and/or a content item to determine an emotion represented by and/or within content and/or a content item. The system 200 may be used to predict and/or determine any occurrence and/or expression within and/or associated with a content item.

The one or more training datasets 210A-210N may comprise labeled baseline data such as labeled emotions, labeled visemes, labeled expressions, and/or the like. The labeled datasets may include features extracted from a content item for each modality (textual, audio, visual, etc.) of the content item. Features may include textual features (e.g., data/information, closed captions, etc.) extracted from the content item, audio features (e.g., data/information, an audio track, etc.) extracted from the content item, visual features (e.g., data/information, pixels, facial/object recognition data, etc.) extracted from frames of the content item, and/or the like. The labeled baseline data may include any number of feature sets (labeled data that identify extracted features for a specific modality of a content item).

The labeled baseline data may be stored in one or more databases. Data determined/extracted from a content item may be randomly assigned to a training dataset or a testing dataset. The assignment of data to a training dataset or a testing dataset may not be completely random. In this case, one or more criteria may be used during the assignment, such as ensuring that similar modal features associated with emotion and/or the like, dissimilar modal features associated with emotion and/or the like, and/or the like may be used in each of the training and testing datasets. In general, any suitable method may be used to assign the data to the training or testing datasets.

The training module 220 may train the machine learning-based classifier 230 by extracting a feature set from the labeled baseline data according to one or more feature selection techniques. In some instances, the training module

220 may further define the feature set obtained from the labeled baseline data by applying one or more feature selection techniques to the labeled baseline data in the one or more training datasets 210A-210N. The training module 220 may extract a feature set from the training datasets 210A-210N in a variety of ways. The training module 220 may perform feature extraction multiple times, each time using a different feature-extraction technique. In some instances, the feature sets generated using the different techniques may each be used to generate different machine learning-based classification models 240. In an embodiment, the feature set with the highest quality metrics may be selected for use in training. The training module 220 may use the feature set(s) to build one or more machine learning-based classification models 240A-240N that are configured to predict an emotion and/or any other expression/occurrence within a content item.

The training datasets 210A-210N and/or the labeled baseline data may be analyzed to determine any dependencies, associations, and/or correlations between textual information, visual information, audio information, and/or any other information (modal information) in the training datasets 210A-210N and/or the labeled baseline data. The term "feature," as used herein, may refer to any characteristic of an item of data that may be used to determine whether the item of data falls within one or more specific categories. By way of example, the features described herein may comprise textual features (e.g., data/information, closed captions, etc.) extracted from a content item, audio features (e.g., data/information, an audio track, etc.) extracted from the content item, visual features (e.g., data/information, pixels, facial/object recognition data, etc.) extracted from frames of the content item, and/or any other characteristics of the content item.

A feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any feature that appears greater than or equal to 2 times in the labeled baseline data may be considered as candidate features. Any features appearing less than 2 times may be excluded from consideration as a feature. A single feature selection rule may be applied to select features or multiple feature selection rules may be applied to select features. The feature selection rules may be applied in a cascading fashion, with the feature selection rules being applied in a specific order and applied to the results of the previous rule. For example, the feature selection rule may be applied to the labeled baseline data to determine/predict an emotion, an expression, and/or any other occurrence within a content item. A final list of candidate features may be analyzed according to additional features.

Multimodal content analytics may be based on a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and the like. In some instances, forward feature selection may be used to identify one or more candidate emotions/expressions occurring within a content item, for example, an emotion expressed by an actor and/or the like. Forward feature selection is an iterative method that begins with no feature in the machine learning model. In each iteration, the feature which best improves the model is added until an addition of a new variable does not improve the performance of the machine learning model. In an embodiment, backward elimination may be used to identify one or more candidate emotions/expressions occurring within a content item. Backward elimination is an iterative method that begins with all features in the machine learning model. In each iteration, the least significant feature is removed until no improvement is observed on removal of features.

Recursive feature elimination may be used to identify one or more candidate emotions/expressions occurring within a content item, for example, based on a modality of the content item. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

One or more candidate emotions/expressions occurring within a content item may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to the absolute value of the magnitude of coefficients and ridge regression performs L2 regularization which adds a penalty equivalent to the square of the magnitude of coefficients.

After training module 220 has generated a feature set(s), the training module 220 may generate a machine learning-based predictive model 240 based on the feature set(s). Machine learning-based predictive model, may refer to a complex mathematical model for data classification that is generated using machine-learning techniques. In one example, this machine learning-based classifier may include a map of support vectors that represent boundary features. By way of example, boundary features may be selected from, and/or represent the highest-ranked features in, a feature set.

In an embodiment, the training module 220 may use the feature sets extracted from the training datasets 210A-210N and/or the labeled baseline data to build a machine learning-based classification model 210A-210N to predicted an emotion and/or the like occurring in a content item, such as an emotion expressed by an actor in a movie. In some examples, the machine learning-based classification models 240A-240N may be combined into a single machine learning-based classification model 240. Similarly, the machine learning-based classifier 230 may represent a single classifier containing a single or a plurality of machine learning-based classification models 240 and/or multiple classifiers containing a single or a plurality of machine learning-based classification models 240. The machine learning-based classifier 230 may also include each of the training datasets 210A-210N and/or each feature set extracted from the training datasets 210A-210N and/or extracted from the labeled baseline data.

The extracted features from and/or associated with a specific modality of a content item, such as textual features, visual features, and/or audio features, may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 230 may comprise a decision rule or a mapping that uses modal content information (e.g., textual information, visual information, audio information, etc.) to determine/predict an emotion, expression, and/or any other occurrence within and/or associated with a content item.

The modal content information and the machine learning-based classifier 230 may be used to predict emotions (and/or the like) for the test samples in the test dataset. In one example, the result for each test sample includes a confidence level that corresponds to a likelihood or a probability that the corresponding test sample accurately predicts an emotion (and/or the like). The confidence level may be a value between zero and one that represents a likelihood that the predicted emotion (and/or the like) consists with a computed value. Multiple confidence levels may be provided for each test sample and for each candidate emotion (and/or the like). A top performing candidate emotion (and/or the like) may be determined by comparing the result obtained for each test sample with a computed emotion (and/or the like) for each test sample. In general, the top performing candidate emotion (and/or the like) will have results that closely match the computed emotion (and/or the like). The top performing candidate emotion (and/or the like) may be used for multimodal content analytics, for example, determining/predicting and emotion, expression, and/or any other occurrence in and/or associated with a content item.

Figure 3:
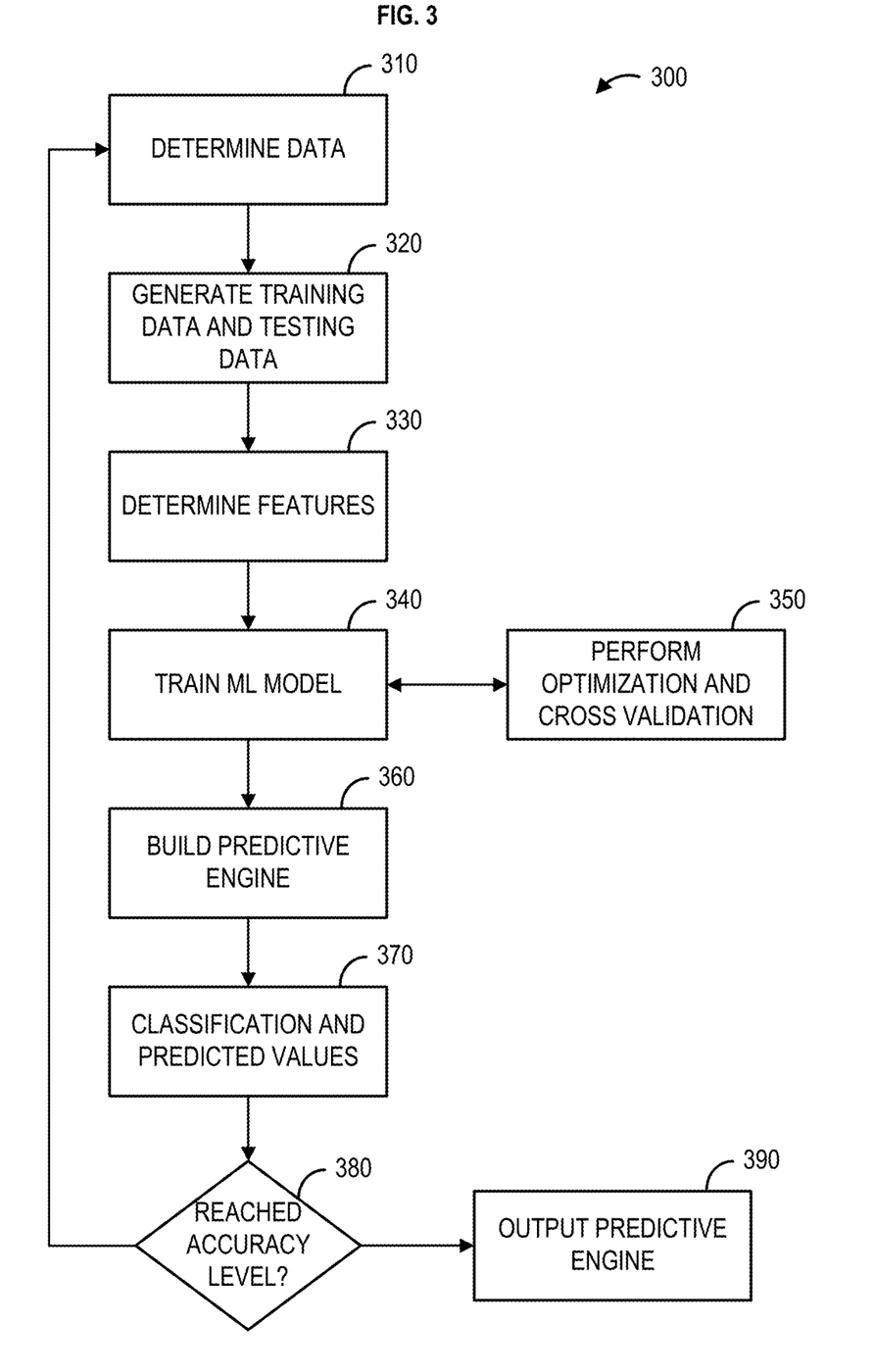
FIG. 3 shows an example flowchart of a method for training a machine learning model for multimodal content analytics.

FIG. 3 is a flowchart illustrating an example training method 300 for generating the machine learning classifier 230 using the training module 220. The training module 220 can implement supervised, unsupervised, and/or semi-supervised (e.g., reinforcement-based) machine learning-based classification models 240. Method 300, shown in FIG. 3, is an example of a supervised learning method; variations of this example of training method are discussed below, however, other training methods can be analogously implemented to train unsupervised and/or semi-supervised machine learning (predictive) models.

The training method 300 may determine information for a modality of a content item (e.g., textual modality, visual modality, audio modality, etc.) at 310. The information for the modality of a content item may contain one or more datasets. Each dataset may include labeled baseline data.

The training method 300 may generate, at 320, a training dataset and a testing dataset. The training dataset and the testing dataset may be generated by calculating and/or computing emotion (and/or any other expression) based on historical predictions of an emotion (and/or any other expression). The training dataset and the testing dataset may be generated by randomly assigning modality (e.g., textual modality, visual modality, audio modality, etc.) data to either the training dataset or the testing dataset. In some instances, the assignment of modality data as training or test samples may not be completely random. In some instances, only the labeled baseline data for a specific feature extracted from modality data may be used to generate the training dataset and the testing dataset. In some instances, a majority of the labeled baseline data extracted from modality data may be used to generate the training dataset. For example, 75% of the labeled baseline data for predicting and emotion (and/or any other expression) extracted from the modality data may be used to generate the training dataset and 25% may be used to generate the testing dataset. Any method or technique may be used to create the training and testing datasets.

The training method 300 may determine (e.g., extract, select, etc.), at 330, one or more features that can be used by, for example, a classifier to label features extracted from modality data. The one or more features may comprise textual features, visual features, audio features, and/or the like. The training method 300 may determine a set of training baseline features from the training dataset. Features of modality data may be determined by any method.

The training method 300 may train one or more machine learning models using the one or more features at 340. In some instances, the machine learning models may be trained using supervised learning. In another embodiment, other machine learning techniques may be employed, including unsupervised learning and semi-supervised. The machine learning models trained at 340 may be selected based on different criteria (e.g., how close a predicted emotion and/or the like is to an actual emotion and/or the like expressed in a content item, etc.) and/or data available in the training dataset. For example, machine learning classifiers can suffer from different degrees of bias. Accordingly, more than one machine learning model can be trained at 340, optimized, improved, and cross-validated at 350.

The training method 300 may select one or more machine learning models to build a predictive model at 360 (e.g., a machine learning classifier, a predictive model, etc.). The predictive engine may be evaluated using the testing dataset. The predictive engine may analyze the testing dataset and generate classification values and/or predicted values at 370. Classification and/or prediction values may be evaluated at 380 to determine whether such values have achieved a desired accuracy level. Performance of the predictive engine may be evaluated in a number of ways based on a number of true positives, false positives, true negatives, and/or false negatives classifications of the plurality of data points indicated by the predictive engine. For example, the false positives of the predictive engine may refer to a number of times the predictive engine incorrectly predicted an emotion and/or the like. Conversely, the false negatives of the predictive engine may refer to a number of times the machine learning model predicted an emotion and/or the like incorrectly, when in fact, the predicted emotion and/or the like matches an actual emotion and/or the like expressed in a content item, for example, by an actor within a scene of a movie. True negatives and true positives may refer to a number of times the predictive engine correctly predicted an emotion and/or the like. Related to these measurements are the concepts of recall and precision. Generally, recall refers to a ratio of true positives to a sum of true positives and false negatives, which quantifies a sensitivity of the predictive engine. Similarly, precision refers to a ratio of true positives a sum of true and false positives.

When such a desired accuracy level is reached, the training phase ends and the predictive engine may be output at 390; when the desired accuracy level is not reached, however, then a subsequent iteration of the training method 300 may be performed starting at 310 with variations such as, for example, considering a larger collection of modality data.

Figure 4:
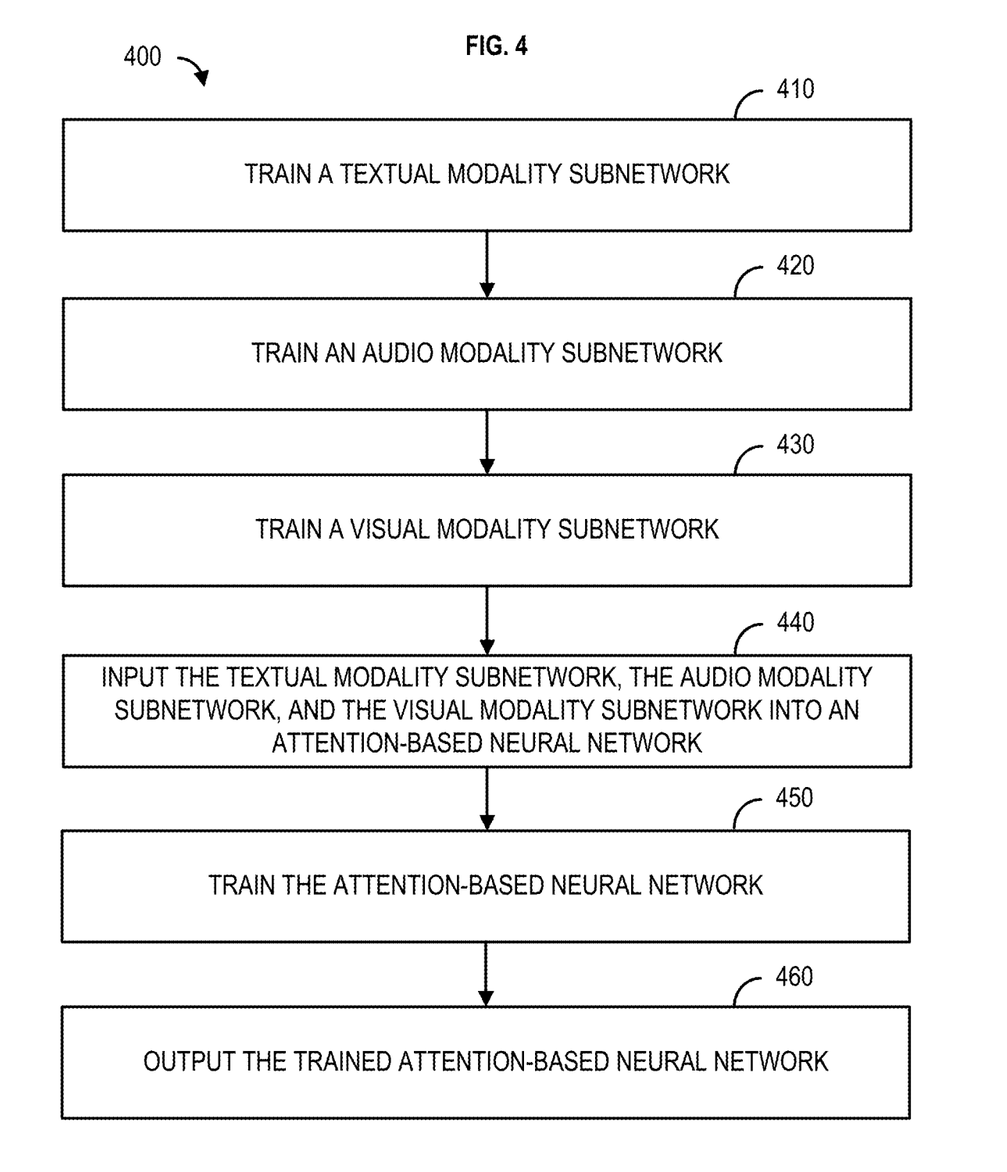
FIG. 4 shows a flowchart of a method for multimodal content analytics.

FIG. 4 shows a flowchart of a method for multimodal content analytics. A multimodal analysis network (MAN) (e.g., the system 100) may be trained to perform predictive and determinative analysis. For example, a MAN may be trained to analyze a content item (e.g., video, multimedia content, live communication, etc.) and determine an expressed emotion, sentiment, and/or the like. The content item may be a multimodal timecoded video. A feature extraction algorithm may be applied to the content item to extract features for each modality (textual, audio, visual, etc.) from the content item at regular time intervals. Textual features may be based on closed captioning data/information and/or the like. Audio features may be based on an audio track of the content item and/or the like. Visual features may be based on pixel dynamics, and/or be determined by facial/object recognition and/or any other image processing technology/technique. Features for each modality (textual, audio, visual, etc.) may be are aligned according to the timecoding of the content item. The content item and extracted features may be used to form a labeled dataset (e.g., classified/tagged data, an identity matrix, etc.). The labeled dataset may be used to train the subnetworks of the MAN. For example, the labeled dataset may inform of an expression (e.g., emotion, etc.) occurring in the content item, such as whether the content item contains a person, what facial expression the person may have, which words are uttered in the audio, what type of actions are being performed in the content item, and/or the like.

At 410, a textual modality subnetwork of the MAN may be trained. The textual modality subnetwork may be a long short-term memory (LSTM) network or any other neural network. The textual modality subnetwork may be trained to determine, identify, and or classify textual elements of the content item. The labeled dataset may be used to train the textual modality subnetwork to determine, identify, and or classify textual elements of the content item. The textual modality subnetwork may produce an output vector that is indicative of a determination/classification and/or probability, such as a prediction of an emotion. The output of the textual modality subnetwork (the last hidden layer) may be modeled as: $h_t = LSTM_t(T)$, where T denotes textual modality.

At 420, an audio modality subnetwork of the MAN may be trained. The audio modality subnetwork may be a long short-term memory (LSTM) network or any other neural network. The audio modality subnetwork may be trained to determine, identify, and or classify audio elements of the content item. The labeled dataset may be used to train the audio modality subnetwork to determine, identify, and or classify audio elements of the content item. The audio modality subnetwork may produce an output vector that is indicative of a determination/classification and/or probability, such as a prediction of an emotion. The output of the audio modality subnetwork (the last hidden layer) may be modeled as: $h_a = LSTM_a(A)$, where T denotes audio modality.

At 430, a visual modality subnetwork of the MAN may be trained. The visual modality subnetwork may be a long short-term memory (LSTM) network or any other neural network. The visual modality subnetwork may be trained to determine, identify, and or classify visual elements of the content item. The labeled dataset may be used to train the visual modality subnetwork to determine, identify, and or classify visual elements of the content item. The visual modality subnetwork may produce an output vector that is indicative of a determination/classification and/or probability, such as a prediction of an emotion. The output of the visual modality subnetwork (the last hidden layer) may be modeled as: $h_v = LSTM_v(V)$, where V denotes visual modality.

At 440, the outputs from the textual modality subnetwork, the audio modality subnetwork, and the visual modality subnetwork may be input ($H=[h_t; h_a; h_v]$) into an attention-based neural network (e.g., the attention block 108, etc.) of the MAN. For example, the softmax layers at the end of the textual modality subnetwork, the audio modality subnetwork, and the visual modality subnetwork may be removed and the output vectors from the textual modality subnetwork, the audio modality subnetwork, and the visual modality subnetwork may be input to the attention-based neural network. The outputs from each subnetwork may be embeddings that provide a dense representation features extracted from the content item and their relative meanings for each modality.

At 450, the MAN may be trained. The content item may be used to train the MAN. The MAN may be trained with the labeled dataset used to train each subnetwork. Training the MAN may train an attention mechanism (e.g., the attention module 109, etc.) of the MAN. The trained attention mechanism may assign a weight to an output of the audio subnetwork, a weight to an output of the text sub-network, and a weight to an output of the visual sub-network that represents the importance of the output (e.g., prediction, etc.) of each subnet to the final output (e.g., prediction, etc.). For example, the weights calculated by the attention mechanism may represent the importance of each prediction of an emotion occurring in the scene of the content item 101.

At 460, an output of the trained MAN may be obtained. The hidden layer of the subnetworks may be multiplied by its respective weight determined by the attention mechanism. The results may be concatenated together, passed through a dense layer (e.g., fully connected layer), then passed through a softmax layer. As a test of the trained MAN, the softmax layer may provide a determination of an emotion expressed in the content item based on the weighted probability predictions of the subnetworks, and the determination of the emotion may be compared to an actual label/identification of the emotion expressed within the content item.

Figure 5:
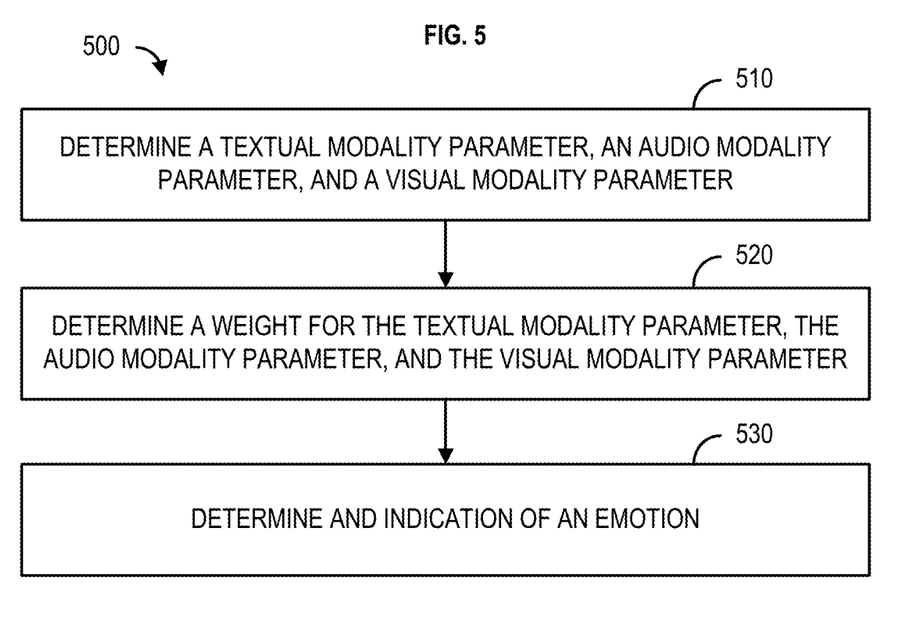
FIG. 5 shows a flowchart of a method for multimodal content analytics.

FIG. 5 shows a flowchart of a method for multimodal content analytics. A multimodal analysis network (MAN) (e.g., the system 100) may determine an expressed emotion, sentiment, and/or the like within and/or associated with a content item (e.g., video, multimedia content, live communication, etc.). For example, a content item may be a multimodal timecoded video.

At 510, to determine an emotion expressed in the content item a textual modality parameter, an audio modality parameter, and a visual modality parameter may be determined. Each parameter may be a prediction of an expressed emotion. A feature extraction algorithm may be applied to the content item to extract features for each modality (textual, audio, visual, etc.) from the content item at regular time intervals. Textual features may be based on closed captioning data/information and/or the like. Audio features may be based on an audio track of the content item and/or the like. Visual features may be based on pixel dynamics, and/or be determined by facial/object recognition and/or any other image processing technology/technique. Features for each modality (textual, audio, visual, etc.) may be are aligned according to the timecoding of the content item. The content item and extracted features may be used to form a labeled dataset (e.g., classified/tagged data, an identity matrix, etc.). The labeled dataset may be used to train the subnetworks of the MAN. For example, the labeled dataset may inform of an expression (e.g., emotion, etc.) occurring in the content item, such as whether the content item contains a person, what facial expression the person may have, which words are uttered in the audio, what type of actions are being performed in a content item, and/or the like.

A textual modality subnetwork, an audio modality subnetwork, and a visual modality subnetwork of the MAN may be trained. Each subnetwork of the MAN may be a long short-term memory (LSTM) network or any other neural network. The textual modality subnetwork may be trained to determine, identify, and or classify textual elements of the content item. The labeled dataset may be used to train the textual modality subnetwork to determine, identify, and or classify textual elements of the content item. The audio modality subnetwork may be trained to determine, identify, and or classify audio elements of the content item. The labeled dataset may be used to train the audio modality subnetwork to determine, identify, and or classify audio elements of the content item. The visual modality subnetwork may be trained to determine, identify, and or classify visual elements of the content item. The labeled dataset may be used to train the visual modality subnetwork to determine, identify, and or classify visual elements of the content item. The output of the subnetworks (the last hidden layers) may be modeled as: $h_t = LSTM_t(T)$; $h_a = LSTM_a(A)$; $h_v = LSTM_v(V)$, where $h_t$; $h_a$; $h_v$ each have the same dimension N. The output of the textual modality subnetwork, the audio subnetwork, and the visual modality subnetwork may be the textual modality parameter, the audio modality parameter, and the visual modality parameter, respectively. The textual modality parameter, the audio modality parameter, and the visual modality parameter may be a prediction of an emotion (or any other expression) by each subnetwork based on the content item.

At 520, a weight for the textual modality parameter, the audio modality parameter, and the visual modality parameter may be determined. The weight for the textual modality parameter, the audio modality parameter, and the visual modality parameter may be determined by an attention module (e.g., the attention module 109, etc.) of the MAN. The attention module may assign a weight to the textual modality parameter, the audio modality parameter, and the visual modality parameter that represents the importance of the textual modality parameter, the audio modality parameter, and the visual modality parameter. For example, the weights calculated by the attention module may represent the importance of each prediction of an emotion made by each subnetwork of the MAN.

At 530, an indication of an emotion may be determined. The indication of the emotion may be determined by the MAN based on an output of the MAN. The hidden layers of the subnetworks of the MAN may be multiplied by their respective weight determined by the attention module. For example, the visual modality parameter may be multiplied by the weight for the visual modality parameter, the audio modality parameter may be multiplied by the weight for the audio modality parameter, and the textual modality parameter may be multiplied by the weight for the textual modality parameter. The results of multiplying each modality parameter by its weight may be concatenated together, passed through a dense layer (e.g., fully connected layer) of the MAN, and then passed through a softmax layer of the MAN. The softmax layer may provide a determination of an emotion expressed in the content item.

Figure 6:
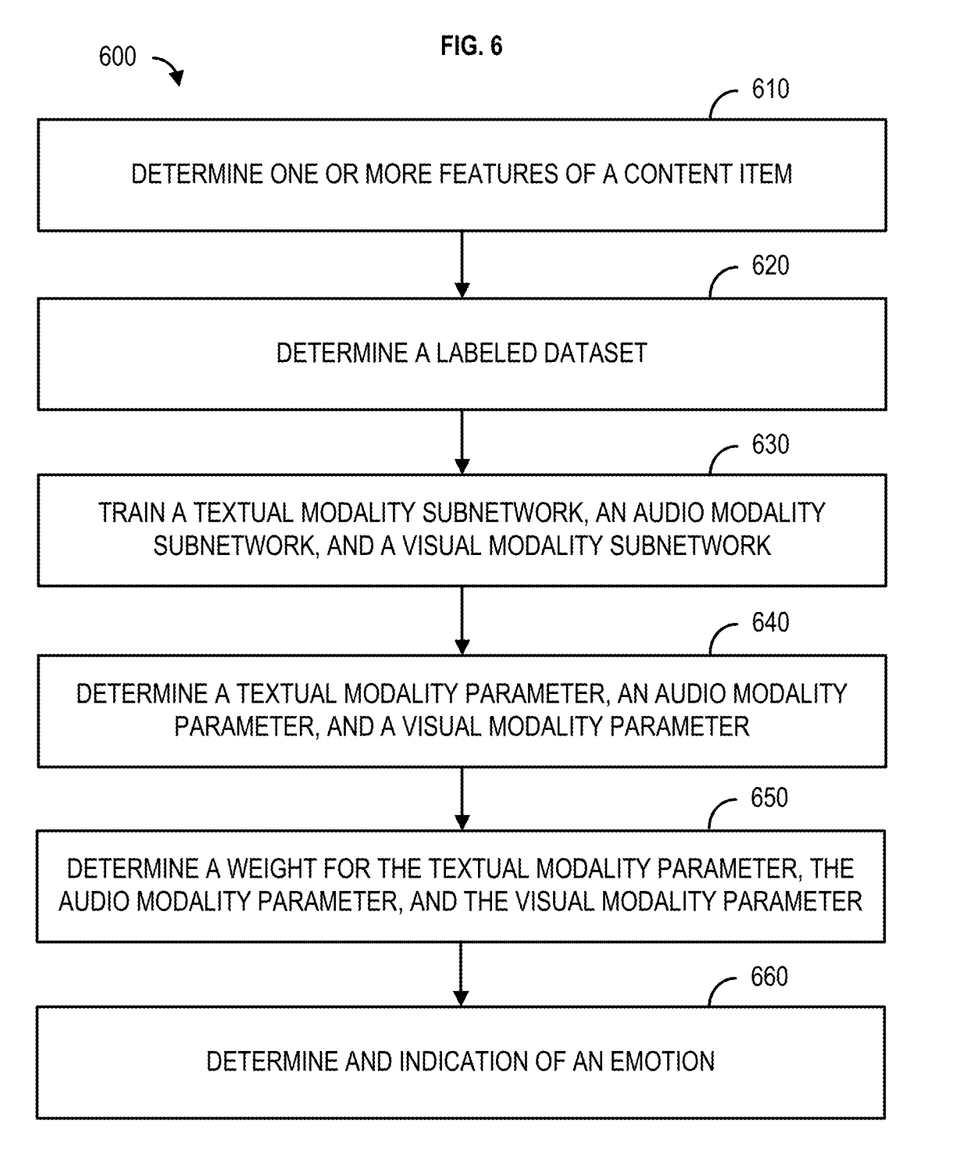
FIG. 6 shows a flowchart of a method for multimodal content analytics and
FIG. 7 shows a block diagram of a computing device for implementing multimodal content analytics.

FIG. 6 shows a flowchart of a method for multimodal content analytics. A trained multimodal analysis network (MAN) (e.g., the system 100) may perform predictive and determinative analysis. The MAN may be a scalable neural network and may include pre-trained subnetworks (e.g., bi-directional neural networks, long short-term memory (LSTM) networks, recurrent neural networks (RNN), etc.) that are each independently trained for a specific modality. The MAN may analyze a content item (e.g., video, multimedia content, live communication, etc.) and determine an expressed emotion, sentiment, and/or the like.

At 610, one or more features of a content item (e.g., video, multimedia content, live communication, etc.). The content item may be a multimodal timecoded video. A feature extraction algorithm may be applied to the content item to extract features for each modality (textual, audio, visual, etc.) from the content item at regular time intervals. Textual features may be based on closed captioning data/information and/or the like. Audio features may be based on an audio track of the content item and/or the like. Visual features may be based on pixel dynamics, and/or be determined by facial/object recognition and/or any other image processing technology/technique. The one or more features of the content item may include features for each modality (textual, audio, visual, etc.). The one or more features of the content item may be are aligned according to the timecoding of the content item.

At 620, a labeled dataset may be determined. The content item and extracted features may be used to form a labeled dataset (e.g., classified/tagged data, an identity matrix, etc.). The labeled dataset may inform of an expression (e.g., emotion, etc.) occurring in the content item, such as whether the content item contains a person, what facial expression the person may have, which words are uttered in the audio, what type of actions are being performed in the content item, and/or the like. The labeled dataset may be used to train subnetworks of the MAN.

At 630, a textual modality subnetwork, an audio modality subnetwork, and a visual modality subnetwork of the MAN may be trained. The content item and the labeled dataset may be used to train each subnetwork for a specific modality. The textual modality subnetwork may be trained to determine, identify, and or classify textual elements of the content item. The textual modality subnetwork may produce an embedding and/or high-level features of the content item. The textual modality subnetwork may produce an output vector that is indicative of a determination/classification and/or probability, such as a prediction of an emotion. The output of the textual modality subnetwork (the last hidden layer) may be modeled as: $h_t = LSTM_t(T)$, where T denotes textual modality.

The audio modality subnetwork may be trained to determine, identify, and or classify audio elements of the content item. The audio modality subnetwork may produce an embedding and/or high-level features of the content item. The audio modality subnetwork may produce an output vector that is indicative of a determination/classification and/or probability, such as a prediction of an emotion. The output of the audio modality subnetwork (the last hidden layer) may be modeled as: $h_a = LSTM_a(A)$, where T denotes audio modality.

The visual modality subnetwork may be trained to determine, identify, and or classify visual elements of the content item. The audio modality subnetwork may produce an embedding and/or high-level features of the content item.

The visual modality subnetwork may produce an output vector that is indicative of a determination/classification and/or probability, such as a prediction of an emotion. The output of the visual modality subnetwork (the last hidden layer) may be modeled as: $h_v=LSTM_v(V)$, where V denotes visual modality.

Once each subnetwork is trained (pre-trained) based on a specific modality (e.g., textual modality, audio modality, visual modality, etc.), the trained subnetworks may be used to determine one or more parameters which may ultimately be used to determine an expression (e.g., emotion, etc.) in the content item.

At 640, a textual modality parameter, an audio modality parameter, and a visual modality parameter may be determined. The output of the subnetworks (the last hidden layers) may be modeled as: $h_t=LSTM_t(T)$; $h_a=LSTM_a(A)$; $h_v=LSTM_v(V)$, where $h_t$; $h_a$; $h_v$ each have the same dimension N. The output of the textual modality subnetwork, the audio subnetwork, and the visual modality subnetwork may be the textual modality parameter, the audio modality parameter, and the visual modality parameter, respectively. The textual modality parameter, the audio modality parameter, and the visual modality parameter may be an indication of an expressed emotion within the content item.

At 650, a weight for each parameter produced by each subnetwork may be determined. A weight may be determined for the textual modality parameter, a weight may be determined for the audio modality parameter, and a weight may be determined for the visual modality parameter. The weight for the textual modality parameter, the audio modality parameter, and the visual modality parameter may be determined by an attention mechanism (e.g., the attention module 109, etc.) of the MAN. The weight determined by the attention mechanism may represent the importance of the textual modality parameter, the audio modality parameter, and the visual modality parameter. For example, the weights determined by the attention mechanism may represent the importance of each indication of an emotion made by each subnetwork of the MAN.

At 660, an indication of an emotion may be determined. The indication of the emotion may be determined by the MAN based on an output of the MAN. The hidden layers of the subnetworks of the MAN may be multiplied by their respective weight determined by the attention module. For example, the visual modality parameter may be multiplied by the weight for the visual modality parameter, the audio modality parameter may be multiplied by the weight for the audio modality parameter, and the textual modality parameter may be multiplied by the weight for the textual modality parameter. The results of multiplying each modality parameter by its weight may be concatenated together, passed through a dense layer (e.g., fully connected layer) of the MAN, and then passed through a softmax layer of the MAN. The softmax layer may provide a determination of an emotion expressed in the content item.

Figure 7:
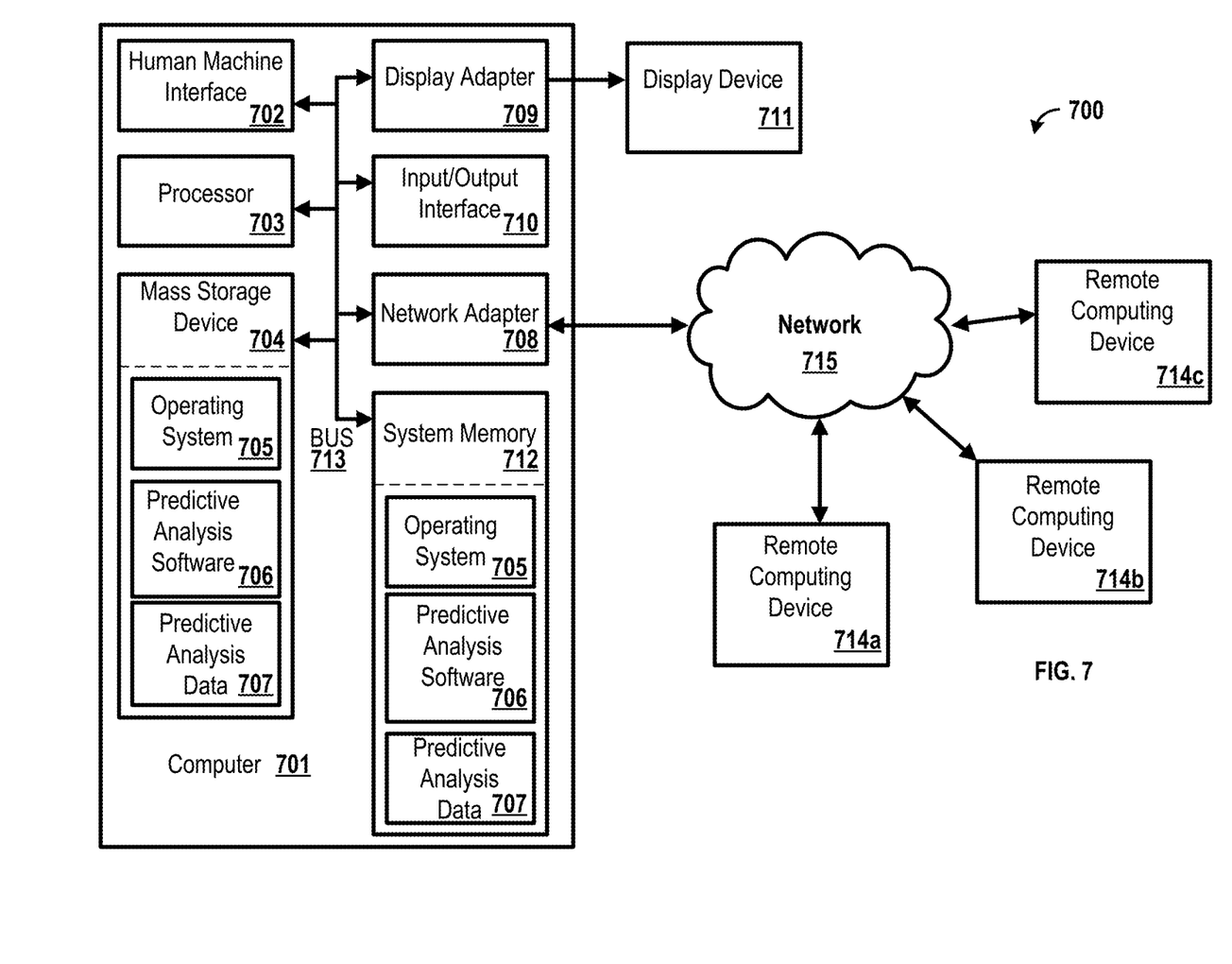

FIG. 7 shows a system 700 for multimodal content analytics. Any component, device, and/or the like described herein may be a computer 701 as shown in FIG. 7.

The computer 701 may comprise one or more processors 703, a system memory 712, and a bus 713 that couples various components of the computer 701 including the one or more processors 703 to the system memory 712. In the case of multiple processors 703, the computer 701 may utilize parallel computing.

The bus 713 may comprise one or more of several possible types of bus structures, such as a memory bus, memory controller, a peripheral bus, an accelerated graphics port, and a processor or local bus using any of a variety of bus architectures.

The computer 701 may operate on and/or comprise a variety of computer-readable media (e.g., non-transitory). Computer-readable media may be any available media that is accessible by the computer 701 and comprises, non-transitory, volatile and/or non-volatile media, removable and non-removable media. The system memory 712 has computer-readable media in the form of volatile memory, such as random access memory (RAM), and/or non-volatile memory, such as read-only memory (ROM). The system memory 712 may store data such as predictive analysis data 707 and/or program modules such as operating system 705 and predictive analysis software 706 that are accessible to and/or are operated on by the one or more processors 703.

The computer 701 may also comprise other removable/non-removable, volatile/non-volatile computer storage media. The mass storage device 704 may provide non-volatile storage of computer code, computer-readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 704. An operating system 705 and predictive analysis software 706 may be stored on the mass storage device 704. One or more of the operating system 705 and predictive analysis software 706 (or some combination thereof) may comprise program modules and the predictive analysis software 706. Predictive analysis data 707 may also be stored on the mass storage device 704. Predictive analysis data 707 may be stored in any of one or more databases known in the art. The databases may be centralized or distributed across multiple locations within the network 715.

A user may enter commands and information into the computer 701 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human-machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

A display device 711 may also be connected to the bus 713 via an interface, such as a display adapter 709. It is contemplated that the computer 701 may have more than one display adapter 709 and the computer 701 may have more than one display device 711. A display device 711 may be a monitor, an LCD (Liquid Crystal Display), light-emitting diode (LED) display, television, smart lens, smart glass, and/or a projector. In addition to the display device 711, other output peripheral devices may comprise components such as speakers (not shown) and a printer (not shown) which may be connected to the computer 701 via Input/Output Interface 710. Any step and/or result of the methods may be output (or caused to be output) in any form to an output device. Such output may be any form of visual representation, including, but not limited to, textual, graphical, animation, audio, tactile, and the like. The display 711 and computer 701 may be part of one device, or separate devices.

The computer 701 may operate in a networked environment using logical connections to one or more remote computing devices 714*a,b,c*. A remote computing device 714*a,b,c* may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 701 and a remote computing device 714*a,b,c* may be made via a network 715, such as a local area network (LAN) and/or a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components may reside at various times in different storage components of the computing device 701, and are executed by the one or more processors 703 of the computer 701. An implementation of predictive analysis software 706 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    extracting, based on a feature extraction algorithm, textual modality features, audio modality features, and visual modality features of a content item;
    determining, by a machine learning model using a machine learning algorithm and based on unlabeled textual data in the textual modality features, a textual modality parameter;
    determining, based on the audio modality features and the visual modality features, an audio modality parameter and a visual modality parameter;
    determining, based on a weight associated with a textual modality, a weighted textual modality parameter, based on a weight associated with an audio modality, a weighted audio modality parameter, and, based on a weight associated with a visual modality, a weighted visual modality parameter; and
    determining, based on the weighted textual modality parameter, the weighted audio modality parameter, and the weighted visual modality parameter, an indication of an emotion, wherein the weight associated with the textual modality, the weight associated with the audio modality, and the weight associated with the visual modality define an importance of the respective textual modality parameter, audio modality parameter, and visual modality parameter in determining the emotion.

2. The method of claim 1, wherein determining the textual modality parameter further comprises:
    providing, to a textual modality subnetwork, labeled textual data, wherein the labeled textual data is based on closed captioning data.

3. The method of claim 1, wherein determining the audio modality parameter comprises:
    providing, to an audio modality subnetwork, the audio modality features comprising labeled audio content and unlabeled audio content, wherein the labeled audio content is based on an audio track; and
    determining, by a second machine learning model and based on the unlabeled audio content, the audio modality parameter.

4. The method of claim 1, wherein determining the visual modality parameter comprises:
    providing, to a visual modality subnetwork, the visual modality features comprising labeled visual content and unlabeled visual content; and
    determining, by a second machine learning model and based on the unlabeled visual content, the visual modality parameter.

5. The method of claim 4, further comprising determining the visual modality features from the content item based on one or more of facial recognition or object recognition.

6. The method of claim 1, wherein the textual modality parameter, the audio modality parameter, and the visual modality parameter each indicate a probability associated with the emotion.

7. The method of claim 1, wherein determining the indication of the emotion comprises:
    determining, based on a product of the textual modality parameter and the weight associated with the textual modality, the weighted textual modality parameter;
    determining, based on a product of the audio modality parameter and the weight associated with the audio modality, the weighted audio modality parameter;
    determining, based on a product of the visual modality parameter and the weight associated with the visual modality, the weighted visual modality parameter; and
    determining, based on the weighted textual modality parameter, the weighted audio modality parameter, the weighted visual modality parameter, and a softmax function, the indication of the emotion.

8. The method of claim 1, wherein the content item comprises video.

9. A method comprising:
extracting, based on a feature extraction algorithm textual modality features, audio modality features, and visual modality features of a content item;
determining, based on the extracted textual modality features, the extracted visual modality features, and the extracted audio modality features of the content item, a labeled dataset;
training, based on the labeled dataset, a textual modality subnetwork, an audio modality subnetwork, and a visual modality subnetwork;
determining, by a machine learning model using a machine learning algorithm of the trained textual modality subnetwork and based on unlabeled textual data of the extracted textual modality features, a textual modality parameter;
determining, based on the extracted audio modality features and, the trained audio modality subnetwork an audio modality parameter;
determining, based on the extracted visual modality features and the trained visual modality subnetwork, a visual modality parameter;
determining, based on a weight associated with a textual modality, a weighted textual modality parameter, based on a weight associated with an audio modality, a weighted audio modality parameter, and, based on a weight associated with a visual modality, a weighted visual modality parameter; and
determining, based on the weighted textual modality parameter, the weighted audio modality parameter, and the weighted visual modality parameter, an indication of an emotion, wherein the weight associated with the textual modality, the weight associated with the audio modality, and the weight associated with the visual modality parameter define an importance of the respective textual modality parameter, audio modality parameter, and visual modality parameter in determining the emotion.

10. The method of claim 9, wherein the textual modality parameter, the audio modality parameter, and the visual modality parameter comprise embeddings that each indicate a probability associated with the emotion.

11. The method of claim 9, wherein the content item comprises video.

12. The method of claim 9, wherein the textual modality subnetwork, the audio modality subnetwork, and the visual modality subnetwork each comprise a long short-term memory (LSTM) neural network.

13. An apparatus comprising:
one or more processors; and
memory storing processor-executable instructions that, when executed by the one or more processors, cause the apparatus to:
extracting, based on a feature extraction algorithm, textual modality features, audio modality features, and visual modality features of a content item;
determining, by a machine learning model using a machine learning algorithm and based on unlabeled textual data in the textual modality features, a textual modality parameter;
determine, based on the audio modality features and the visual modality features, an audio modality parameter and a visual modality parameter;
determine, based on a weight associated with a textual modality, weighted textual modality parameter, based on a weight associated with an audio modality, a weighted audio modality parameter, and, based on a weight associated with a visual modality, a weighted visual modality parameter; and
determine, based on the weighted textual modality parameter, the weighted audio modality parameter, and the weighted visual modality parameter, an indication of an emotion, wherein the weight associated with the textual modality, the weight associated with the audio modality, and the weight associated with the visual modality define an importance of the respective textual modality parameter, audio modality parameter, and visual modality parameter in determining the emotion.

14. The apparatus of claim 13, wherein the processor-executable instructions that, when executed by the one or more processors, cause the apparatus to determine the textual modality parameter, further cause the apparatus to:
provide, to a textual modality subnetwork, labeled textual data, wherein the labeled textual data is based on closed captioning data.

15. The apparatus of claim 13, wherein the processor-executable instructions that, when executed by the one or more processors, cause the apparatus to determine the audio modality parameter, cause the apparatus to:
provide, to an audio modality subnetwork, the audio modality features comprising labeled audio content and unlabeled audio content, wherein the labeled audio content is based on an audio track; and
determine, by a second machine learning model and based on the unlabeled audio content, the audio modality parameter.

16. The apparatus of claim 13, wherein the processor-executable instructions that, when executed by the one or more processors, cause the apparatus to determine the visual modality parameter, cause the apparatus to:
provide, to a visual modality subnetwork, the visual modality features comprising labeled visual content and unlabeled visual content; and
determine, by a second machine learning model and based on the unlabeled visual content, the visual modality parameter.

17. The apparatus of claim 16, wherein the processor-executable instructions, when executed by the one or more processors, further cause the apparatus to determine the visual modality features from the content item based on one or more of facial recognition or object recognition.

18. The apparatus of claim 13, wherein the textual modality parameter, the audio modality parameter, and the visual modality parameter each indicate a probability associated with the emotion.

19. The apparatus of claim 13, wherein the processor-executable instructions that, when executed by the one or more processors, cause the apparatus to determine the indication of the emotion, cause the apparatus to:
determine, based on a product of the textual modality parameter and the weight associated with the textual modality, the weighted textual modality parameter;
determine, based on a product of the audio modality parameter and the weight associated with the audio modality, the weighted audio modality parameter;
determine, based on a product of the visual modality parameter and the weight associated with the visual modality parameter, the visual modality parameter; and
determine, based on the weighted textual modality parameter, the weighted audio modality parameter, the weighted visual modality parameter, and a softmax function, the indication of the emotion.

20. The apparatus of claim 13, wherein the content item comprises video.

21. An apparatus comprising:
one or more processors; and
memory storing processor-executable instructions that, when executed by the one or more processors, cause the apparatus to:
extracting, based on a feature extraction algorithm, textual modality features, audio modality features, and visual modality features of a content item;
determine, based on the extracted textual modality features, the extracted audio modality features, and the extracted visual modality features of the content item, a labeled dataset;
train, based on the labeled dataset, a textual modality subnetwork, an audio modality subnetwork, and a visual modality subnetwork;
determine, by a machine-learning model using a machine learning algorithm of the trained textual modality subnetwork and based on unlabeled textual data of the extracted textual modality features, a textual modality parameter;
determine, based on the extracted audio modality features and, the trained audio modality subnetwork, an audio modality parameter;
determine, based on the extracted visual modality features and the trained visual modality subnetwork, a visual modality parameter;
determine, based on a weight associated with a textual modality, weighted textual modality parameter, based on a weight associated with an audio modality, a weighted audio modality parameter, and, based on a weight associated with a visual modality, a weighted visual modality parameter; and
determine, based on the weighted textual modality parameter, the weighted audio modality parameter, and the weighted visual modality parameter, an indication of an emotion, wherein the weight associated with the textual modality, the weight associated with the audio modality, and the weight associated with the visual modality define an importance of the respective textual modality parameter, audio modality parameter, and visual modality parameter in determining the emotion.

22. The apparatus of claim 21, wherein the textual modality parameter, the audio modality parameter, and the visual modality parameter comprise embeddings that each indicate a probability associated with the emotion.

23. The apparatus of claim 21, wherein the content item comprises video.

24. The apparatus of claim 21, wherein the textual modality subnetwork, the audio modality subnetwork, and the visual modality subnetwork each comprise a long short-term memory (LSTM) neural network.

* * * * *